United States Patent [19]

DeMeuse et al.

[11] Patent Number: 5,314,983
[45] Date of Patent: May 24, 1994

[54] PROCESS FOR CURING POLYMERIZABLE LIQUID COMPOSITIONS BASED ON POLYISOCYANATES AND EPOXIDES

[75] Inventors: Mark T. DeMeuse, Robbinsville, N.J.; Fabrizio Parodi, Genova, Italy

[73] Assignee: Enichem S.P.A., Milan, Italy

[21] Appl. No.: 973,743

[22] Filed: Nov. 9, 1992

[51] Int. Cl.$^5$ .................... C08G 18/58; C08G 18/82; C08J 3/28; C08L 63/00
[52] U.S. Cl. .................... 528/73; 525/528; 522/65; 522/78; 522/166; 522/170; 522/173; 524/847; 524/871
[58] Field of Search ............. 525/528; 528/73; 522/65, 78, 166, 170, 173; 524/847, 871

[56] References Cited

U.S. PATENT DOCUMENTS

| | | | |
|---|---|---|---|
| 3,020,262 | 2/1962 | Speranza | 528/73 |
| 3,687,897 | 8/1972 | Clarke | 525/528 |
| 3,702,839 | 11/1972 | Glasgow et al. | 528/51 |
| 3,721,650 | 3/1973 | D'Alelio | 528/73 |
| 3,876,432 | 4/1975 | Carlick et al. | 525/528 |
| 3,905,945 | 9/1975 | Iseda et al. | 528/73 |
| 4,056,579 | 11/1977 | Nishikawa et al. | 528/73 |
| 4,276,405 | 6/1981 | Koleske et al. | 525/415 |
| 4,562,227 | 12/1985 | Rogler et al. | 524/786 |
| 4,564,651 | 1/1986 | Markert et al. | 524/402 |
| 4,631,306 | 12/1986 | Markert et al. | 523/457 |
| 4,705,838 | 11/1987 | Goel | 528/48 |
| 4,728,676 | 3/1988 | Muller et al. | 521/107 |
| 4,742,142 | 5/1988 | Shimizu et al. | 528/15 |
| 5,112,932 | 5/1992 | Koenig et al. | 528/52 |
| 5,138,016 | 8/1992 | Murdock et al. | 526/270 |
| 5,145,880 | 9/1992 | Parodi et al. | 521/115 |

FOREIGN PATENT DOCUMENTS

| | | |
|---|---|---|
| 00129800 | 1/1985 | European Pat. Off. . |
| 57-003812 | 1/1982 | Japan . |
| 57-003813 | 1/1982 | Japan . |
| 57-003814 | 1/1982 | Japan . |

OTHER PUBLICATIONS

Proceedings of 5th Amer. Soc. Compl, (1990), pp. 239–248, "Thermal and Kinetic Study of Microwave Cured Epoxy Resins", Wei et al.

Herweh et al, "2-Oxazolidones via the Lithium Bromide Catalyzed Reaction of Isocyanates with Epoxides in Hydrocarbon Solvents", Tetrahedron Letters No. 12, Pergamon Press, Great Britain, 1971, pp. 809–812.

*Primary Examiner*—Maurice J. Welsh
*Assistant Examiner*—Rabon Sergent
*Attorney, Agent, or Firm*—Oblon, Spivak, McClelland, Maier & Neustadt

[57] ABSTRACT

Mixtures of polyisocyanates and epoxides are cured by microwave irradiation, optionally with microwave or thermal post-curing to produce cured polymer articles having good chemical, electrical and mechanical properties.

15 Claims, 1 Drawing Sheet

PROCESS FOR CURING POLYMERIZABLE LIQUID COMPOSITIONS BASED ON POLYISOCYANATES AND EPOXIDES

BACKGROUND OF THE INVENTION

1. Field of the Invention

The present invention relates to a process for curing polymerizable liquid compositions of polyisocyanates and epoxies. In particular, the present invention relates to a process for curing liquid compositions containing at least one compound having more than one epoxide group and at least one compound having more than one isocyanate group, in the presence of non-ionizing electromagnetic radiation in the microwave or radio range of frequencies. The material which is produced is a high-performance thermoset which can be quickly formed from a liquid, low-viscosity starting material. The resin hardening, which is preferably followed by a post-curing treatment, must occur quickly at room to moderate temperatures, without the occurrence of overheating phenomena due to the reaction exotherm.

2. Discussion of the background

Industrial sectors calling for both high-performance and rapid curing resins are:

a) Structural fiber-reinforced articles which are fabricated by fast processes such as resin transfer molding, structural reaction injection molding (RIM), pultrusion, and pulforming, for land transportation, boats, aerospace, chemical and petrochemical industries, off-shore drilling, etc.;

b) Insulation and encapsulation of electrical/electronic devices by pressure or vacuum casting;

c) Electrical/mechanical devices insulators, connectors, electrodes, switches, etc.) to be fabricated by RIM or RRIM.

Performance requirements of suitable thermoset resins are high softening point ($>200°$ C.), low flammability, hydrolytic resistance, chemical and solvent resistance, and dielectric rigidity. A broad range of high performance resins are already available: epoxy resins with anhydride or aromatic polyamine curing agents, polyimides and other heterocyclic resins, bismaleimides, etc. These resins are characterized by important drawbacks: i) in general, slow hardening cycles (unsuitable for fast processing) unless high temperatures are adopted, causing in turn, overheating; ii) poor hydrolytic stability and chemical resistance because ester, amide, imide linkages are easily hydrolyzed; iii) high viscosities (epoxy systems generally have viscosities in the range of thousands of centipoise at room temperature).

It is known that polymeric products containing isocyanurate and/or oxazolidone moieties are attainable by polymerization of mixtures of polyisocyanates and epoxy compounds. Thermoset materials prepared from polyfunctional isocyanates and epoxies are characterized by softening temperatures, generally higher than 250° C., excellent hydrolytic stability, chemical and solvent resistance, low flammability (improved up to the self-extinguishing point by addition of mineral fillers), and low dielectric constant (good dielectric properties). Reactive compositions constituted by liquid isocyanates and epoxy resins can be easily prepared with viscosities of a few hundred centipoise at room temperature.

It is known as well, that the polymerization of liquid mixtures of diisocyanates or polyisocyanates and monoepoxides or polyepoxides can be promoted by using tertiary amines, quaternary ammonium salts, or tetra-alkyl phosphonium halides. See, for example, DE 3,323,084, DE 3,323,122, DE 3,323,123, DE 3,323,153, DE 3,600,767; U.S. Pat. No. 3,687,897 and U.S. Pat. No. 4,742,142.

According to these and other patents, the polymerization of mixtures comprising polyisocyanates, polyepoxides and a suitable catalyst is usually accomplished, with subsequent gelation and hardening, by heating at temperatures within the range of from 60° C. to 150° C. and, preferably, within the range of from 80° C. to 130° C. The polymerization is subsequently completed by maintaining the solidified material at temperatures higher than 150° C. for a prolonged period of time, normally a matter of hours.

Although more active catalysts have been described (boron trifluoride and its complexes with a variety of compounds including alcohols, ethers, amines, or amides, etc.), for example, in U.S. Pat. No. 4,705,838 and Japanese patents 57 00 3812, 57 00 3813, and 57 00 3814, they are unsuitable for most industrial applications. Despite the fact that they allow the hardening to occur at room temperature, hydrofluoric acid may be evolved by boron trifluoride hydrolysis in the cured material under the influence of atmospheric moisture. Hydrofluoric acid can be responsible for corrosion of metal inserts, glass fibers, ceramic devices, etc. For this reason, neutral (e.g., quaternary ammonium or phosphonium salts) or slightly basic compounds (tertiary amines) are largely preferred as the isocyanate/epoxy catalysts, despite the fact that their lower catalytic efficiency requires, for hardening in a few minutes or a few tens of minutes at 20°-80° C., catalyst concentrations of up to 3-4%.

Unfortunately, the compositions which are known and therefore the finished articles which can be obtained from them, are not completely free from drawbacks, in particular associated with the catalytic systems used. Among others, some of these deficiencies are:

(a) Fast polymerization rates are only possible at considerably high temperatures, or in the presence of high catalyst concentrations.

(b) The exothermic polymerization reaction produces local overheating in the core of the articles, especially when thick shaped, which can cause decomposition, bubbling and embrittlement of the final polymer.

(c) The external heating of the compositions in order to reach the curing or post-curing temperatures produces local overheating on the surfaces of the articles made, unless a very slow heating process is used.

In order to solve the problem of overheating, cooling systems have been studied. However, these have proven not to be sufficient for very large and/or thick articles. Moreover, cooling can slow down the polymerization after the reaction peak exotherm, therefore requiring very long post-curing cycles.

It is known that some substances, having a high dielectric loss factor, can be heated by submitting them to an electromagnetic field in the microwave range of frequencies. Microwave treatments have been proposed for accelerating the cure of particularly suitable thermosetting resins, where the presence of highly dipolar groups (i.e., sulfonyl or ester) provides sensitivity to microwave radiation. Examples are: (a) curing of an epoxy resin system containing the diglycidylether of bisphenol A and 4,4'-diaminodiphenylsulfone (DDS)

(See for example, J. Wei et al, Proc. 5th Amer. Soc. Comp., 1990, page 239), whose sulfonyl group implies a very slow polymerization process, still unsuitably slow for fast hardening, as required by RTM, RIM, etc., even under the influence of microwaves; (b) curing of unsaturated polyester resins, whose final performance is in the range of commodity materials (glass transitions less than 140° C., up to 180° C. with the best vinyl-ester resins, poor hydrolytic and chemical resistance and very poor flame resistance) and are unsuitable for heavy-duty thermal, chemical, and electrical applications.

Despite considerable research in the field, a need continues to exist for improved methods of producing low-viscosity thermoset resins having good thermal, chemical, mechanical and dielectric properties.

SUMMARY OF THE INVENTION

Accordingly, one object of the present invention is to provide a fast process for obtaining polymeric products from low-viscosity resins which are particularly suitable to fabricate articles or devices for heavy-duty applications (thermal, electrical, chemical, etc.) by fast industrial technologies such as RTM, RIM, R-RIM, S-RIM, pultrusion, pulforming, etc.

Another object of the present invention is to overcome the drawbacks of prior art processes associated with the overheating of thermosetting compositions based on mixtures of polyisocyanates and polyepoxides during fast curing at high temperature, without decreasing the excellent thermal, chemical, mechanical, and dielectric properties of the products obtained.

Another object of the invention is to provide full cured polymeric materials containing isocyanurate and 2-oxazolidone structures without a post-curing cycle or with a shortened post-curing cycle.

These and other objects, which will become apparent in the course of the following description, have been achieved by the present process in which non-ionizing electromagnetic radiation is used to cure compositions containing:

A) at least one organic polyisocyanate;

B) at least one polyepoxide or a monoepoxide or a mixture thereof;

C) at least one compound which can catalyze the reaction of epoxides and isocyanates to form 2-oxazolidone structures.

The process of the invention has the following steps:

i) mixing components A), B) and C) and placing the composition into a microwave heating device;

ii) polymerizing (curing) the composition by applying a non-ionizing electromagnetic radiation in the microwave range of frequencies;

iii) removing the polymerized (cured) composition from the heating device.

DETAILED DESCRIPTION OF THE PREFERRED EMBODIMENTS

According to the present process, the composition containing (A), (B) and (C) must be liquid and homogeneous at the processing temperature.

Compositions which are liquid at temperatures below 60° C. are preferred.

In the polymerization reaction in step (ii) of the present invention there are formed cyclic units, derived from the 2-oxazolidone molecule, having the following structure (I):

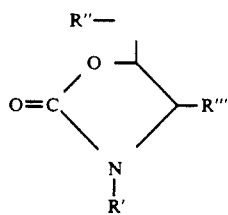

wherein:

R' is a generic polymeric chain or branch and

R'' and R''' are independently, hydrogen or a generic substituent, where at least one is a generic polymeric chain or branch. Preferably, one of R'' and R''' is hydrogen and the other one is a polymeric chain or chain branch.

Suitable organic polyisocyanates for use as component (A) in the above compositions are those belonging to the family of compounds having the formula (II)

$$Q(NCO)_m \qquad (II)$$

where m is higher than 1, preferably is within the range from 2 to 4, and Q is an organic m-valent, preferably divalent or trivalent, group of from 6 to 24 carbon atoms, generally an aliphatic, cycloaliphatic, aromatic, heterocyclic or mixed aliphatic, cycloaliphatic, aromatic and/or heterocyclic compound.

A large number of suitable diisocyanates of the type described above have been reported, e.g., in the chapter "Diisocyanates" by A. A. R. Sayigh, H. Ulrich and W. J. Farissey, Jr. in "Condensation Monomers", edited by J. K. Stille and T. W. Campbell, published by Wiley-Interscience, New York, 1972, pages 369–476.

The above organic group Q may also contain heteroatoms not belonging to cyclic structures and/or several functional or bonding groups, which may contain or not contain heteroatoms, such as ether, thioether, ester, allophonate, and bioret groups, olefinic double bonds, acetylenic triple bonds, and others.

According to a preferred embodiment of the present invention, polyisocyanates which are liquid at temperatures lower than 60° C., preferably lower than 20° C., are used. Also, mixtures of different polyisocyanates, and among these mixtures, preferably those which are liquid at temperatures lower than 60° C. can be used.

According to the present invention, polyisocyanates are preferably used, which are selected from aromatic polyisocyanates, and mixtures thereof. These polyisocyanates and their mixtures include toluene-2,4-diisocyanate, toluene-2,6-diisocyanate and their mixtures; diphenylmethane-4,4'-diisocyanate; diphenylmethane-2,4'-diisocyanate, diphenylmethane-2,2'-diisocyanate and their mixtures; naphthalene-1,5-diisocyanate; 1,4-phenylenediisocyanate; 3,3'-dimethyldiphenylene-4,4'-diisocyanate; diphenylether-4,4'-diisocyanate; and triphenylmethane-4,4',4''-triisocyanate. Other aromatic polyisocyanates which can be advantageously used are those poly-phenylmethylene-polyisocyanates which are obtained by phosgenation of the condensation products of aniline with formaldehyde.

Modified aromatic polyisocyanates which can be used, are the isocyanate adducts which are obtained from the reaction of one mole of a polyol containing "p" alcoholic hydroxy groups, with "m.p." moles of an aromatic polyisocyanate of the above cited type containing "m" isocyanate groups, and in particular, with "2p" moles of an aromatic diisocyanate, preferably selected from among the above cited diisocyanates, or mixtures thereof. Useable polyols are, e.g, ethylene glycol, diethylene glycol, triethylene glycol, tetraethylene glycol, propylene glycol, dipropylene glycol, tripropylene glycol, 1,3-butanediol and 1,4-butanediol, 1,5-pentanediol, 1,6-hexanediol, trimethyl-1,1,6-hexanediols, glycerol, 1,1,1-trimethylolpropane, 1,1,1-trimethylolethane and mixtures thereof. The isocyanate adducts, or mixtures of several isocyanate adducts of the above type, or mixtures of such adducts with aromatic polyisocyanates of the above cited type, which are liquid at temperatures lower than 60° C. are preferably used. Examples of such isocyanate adducts which can be advantageously used, are those adducts which are liquid at room temperature, derived from aromatic polyisocyanates which are solid at room temperature, such as those adducts which can be obtained from the reaction of diphenylmethane-4,4'-diisocyanate with dipropylene glycol or triethylene glycol.

Other aromatic polyisocyanates which can be advantageously used, are the isocyanic prepolymers which are obtained from the reaction of an aromatic polyisocyanate, selected from among those noted above, or a mixture thereof, with a polymeric polyol having an average molecular weight within the range of from about 200 to 15,000. Such isocyanic prepolymers are obtained by reacting amounts of aromatic polyisocyanate and of polyol, such that the molar ratio of isocyanate groups to alcoholic hydroxy groups is equal to 2 or higher. Suitable polymeric polyols are polyalkylene-ether-diols, such as, poly(ethylene glycol), poly(propylene glycol), poly(tetramethylene glycol), poly(hexamethylene glycol) and the corresponding mixed polyalkylene-ether-diols.

Aromatic polyisocyanates which are liquid at temperatures not higher than 40° C. or, preferably not higher than 60° C. are commercially available. Isocyanates of this type are, e.g., toluene-2,4-diisocyanate, toluene-2,6-diisocyanate and mixtures of these isomers and, in particular, the mixture of both 2,4- and 2,6-isomers, in the ratio of 80:20; diphenylmethane-4,4'-diisocyanate (MDI), and the mixtures thereof with the corresponding isomers diphenylmethane-2,4'- diisocyanate and also diphenylmethane-2,2'-diisocyanate. Aromatic polyisocyanates which are obtained by phosgenation of the aromatic polyamines derived from the condensation of aniline with formaldehyde in various ratios to each other, and according to different condensation processes are also commercially available and preferred.

The isocyanates which can be obtained in this way, and which are commonly designated "crude MDI", are complex mixtures containing diphenylmethane-4,4'-diisocyanate and diphenylmethane-2,4'- diisocyanate together with other isomers thereof, and various polyphenylmethylene polyisocyanates in variable mutual ratios. Such mixtures can contain isocyanates containing carbodiimide groups deriving from condensations between the isocyanates, as well as/or isocyanic adducts or urethonimine adducts of the carbodiimidic compounds with the isocyanates.

Component (B) of the reactive composition of the present invention is a monoepoxide or preferably, a polyepoxide or a mixture of different mono-epoxides and/or polyepoxides. The epoxides are organic aliphatic, cycloaliphatic, aromatic, heterocyclic, or compounds with a mixed structure of these, at the end of which molecular epoxide groups are present in a number equal to or higher than 1, and preferably equal to or higher than 2. A large number of suitable diepoxides and polyepoxides of this type are listed, e.g., in the following references:

a) "Handbook of Epoxy Resins" by H. Lee and K. Neville, McGraw-Hill, New York, 1967 (or anastatic reprint of 1982), pages 4–36 to 4–70, and b) "Epoxy Resins. New Results and Developments", by F. Lohse, Die Makromolekulare Chemie, Macromolecular Symposia, vol. 7, pages 1–16 (1987).

The diepoxides and polyepoxides which can be used include the polyglycidylethers of bisphenols and multivalent phenols, such as 2,2-bis-(4-hydroxyphenyl)-propane ("bisphenol A"), 4,4'-dihydroxydiphenylmethane ("bisphenol F") and its isomers, 4,4'-dihydroxydiphenylether, 4,4'-dihydroxy-phenyl-sulfone ("bisphenol S"), hydroquinone and those hydroquinones which contain various substituents on their benzene ring, resorcinol, pyrocatechol, phloroglucinol, methyl-phloroglucinol, 1,1,3-tris-(4-hydroxyphenyl)-propane, tris-(4-hydroxyphenyl)-methane, 2,2', 4,4'-tetrahydroxy-biphenyl, chlorinated or brominated bisphenols, such as 2,2-bis-(4-hydroxy-3,5-dichlorophenyl)-propane ("tetrachlorobisphenol A") and 2,2-bis-(4-hydroxy-3,5-dibromophenyl)-propane ("tetrabromobisphenol A"), as well as the polyglycidylethers of novolacs, which can be obtained by polycondensation, in particular acid-catalyzed polycondensation, of phenols with aldehydes, such as phenol formaldehyde and orthocresol formaldehyde novolacs.

Other polyepoxides which can be used are the polyglycidylesters of polycarboxylic acids of aliphatic, cycloaliphatic, aromatic, and mixed structure compounds, such as adipic acid, linoleic acid dimer or trimer, hexahydrophthalic acid, methylhexahydrophthalic acid, 1,4-cyclohexane-dioic acid, phthalic acid, isophthalic acid, as well as the polyglycidylesters of polycarboxylic acids which can be obtained by reaction of one mole of a polyol containing "n" hydroxy groups with "n" moles of a cycloaliphatic or aromatic dicarboxylic acid or the corresponding anhydride or acid chloride.

Useable polyepoxides also include those which are obtained by N-alkylation of aromatic amines, or N-alkylation and etherification of aminophenols, with epichlorohydrin. Such polyepoxides include N,N-diglycidylaniline, N,N,N',N'-tetraglycidyl-4,4'-diaminodiphenylmethane, N,N,N',N'-tetraglycidyl-4,4'-diaminodiphenylsulfone, and N,N-diglycidyl-4-glycidoxy-aniline.

Furthermore, N-glycidylamides can be used, e.g., N,N'-diglycidyloxamide, as well as polyepoxides containing heterocyclic structures, such as triglycidyl-isocyanurate, 1,2,4-triglycidyl-1,2,4- triazoline-dione, poly-glycidyl-1,3-bis-(3-hydantoinyl)2-hydroxypropane, as well as poly-(2-alkyl-glycidyl)ethers, and in particular, poly-(2-methyl-glycidyl)-ethers, of bisphenols and multivalent phenols, such as the bis-(2-methylglycidyl)-ether of bisphenol A.

Polyepoxides which can be used are also those which are obtained, for example, from the reaction of a diepoxide with a bisphenol, in a variable mutual molar ratio of diepoxide/bisphenol higher than 1 and not higher than 2. These polyepoxides have increasing values of average molecular weight and epoxide equivalent weight as the ratio, of the molar amounts of diepoxide to bisphenol supplied to the reaction, decreases from 2 towards a value of 1.

Such a diepoxide is a "higher homologue" of the diglycidylether of bisphenol A, having the chemical structure:

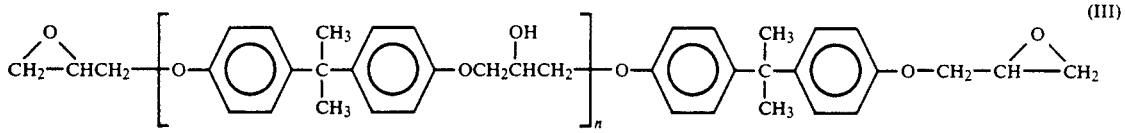

(III)

and mixtures of these, with an average "n" value within the range of from about 0.2 to about 30, as well as the corresponding diepoxides, which are the "higher homologues" of bisphenol F diglycidylether.

other polyepoxides which can be used are the polyglycidylethers of such polyols as 1,4-butanediol, 1,6-hexanediol, neopentylglycol, 1,4-dimethylol-cyclohexane, 2,2-bis-(4-hydroxycyclohexyl)-propane ("hydrogenated bisphenol A"), polypropylene glycol, glycerol, 1,1,1-trimethylolpropane, pentaerythritol, and castor oil.

Those polyepoxides can be used as well, which can be obtained by polyepoxidation, e.g., with peracids, of compounds containing 2 or more olefinic double bonds, such as butadiene, 1,5-cyclooctadiene, 1,5,9-cyclododecatriene, bicyclopentadiene, 3-vinylcyclohexene, divinylbenzene, 4,4'-diallyldiphenylether, 2,2-bis-(4-allyl-cyclohexyl)-propane, polyunsaturated olefins containing 2 or more cyclohexene rings or cyclopentene rings linked by simple or multiple bridges of atoms, such as bis-(2-cyclopentenyl)-ether, 2-(3-cyclohexenyl)-5,5-spirocyclohex-3-ene metadioxane, 3-cyclohexenylmethyl-3-cyclohexanoate, bis-(3-cyclohexenylmethyl)adipate, esters of polyols with unsaturated carboxylic acids, such as vegetable oils, polymers and copolymers containing olefinic double bonds, such as polybutadiene, polyisoprene and their copolymers with other vinylic monomers, such as styrene, as well as unsaturated polyesters. Also, polymers containing epoxide groups, which are obtained from vinylglycidyl monomers, such as glycidyl acrylate, glycidyl methacrylate, allyl-glycidyl ether and their copolymers with other vinylic monomers, such as styrene, a-methylstyrene, vinyl acetate, alkyl acrylates and methacrylates, can be used.

According to the present invention, mixtures of monoepoxides with polyepoxides of the types mentioned above, can be used. The monoepoxides include the glycidylethers of such alcohols as butanol, heptanol, octanol, 2-ethyl-hexanol, allylic alcohol, as well as the glycidyl ethers of such phenols as phenol, paracresol, para-tert-butylphenol and nonylphenol.

The polyepoxides are preferably liquid at temperatures lower than 60° C., more preferably liquid at temperatures lower than 20° C. Mixtures of different polyepoxides, and in particular, mixtures which are liquid at temperatures lower than 60° C. are preferred.

The two components (A) and (B) can be mixed in a molar ratio between the isocyanate and epoxy groups ranging from 1/1 to 6/1, preferably from 1.5/1 to 5/1. The more preferred ratios are in a range such that the isocyanate group and the epoxy group are in a molar ratio from 1.5/1 to 3/1.

Catalysts (C) suitable for the present process are all those generally known in the art to catalyze the reaction of epoxides and isocyanates to form isocyanurate and 2-oxazolidone structures. Among these, tertiary amines, quaternary ammonium salts or tetraalkyl-phosphonium halides are preferred, and particularly those catalysts disclosed in DE 3,323,084; DE 3,323,122; DE 3,323,123; DE 3,323,153, DE 3,600,767; and in U.S. Pat. No. 3,687,897 and U.S. Pat. No. 4,742,152 incorporated herein by reference. Typical catalysts are 4-ethyl-2-methylimidazole, tetrabutylammonium bromide, tetrabutylammonium iodide, trimethyl-benzylammonium chloride, tetrabutylphosphonium iodide, tetraethylammonium bromide, and the like.

Other catalysts preferred for the present invention are compounds containing β-hydroxyalkyl-trialkylammonium halide groups; prepared, for example, by the reaction of an epoxy compound with a suitable amount of a secondary monoamine compound to form a tertiary β-hydroxyamine group, followed by quaternization of the tertiary β-hydroxyamine group with an alkyl halide. Examples of such catalysts are [(2-hydroxy-3-butoxy)propyl]tributylammonium iodide, [(2-hydroxy-3-phenoxy)propyl)tributylammonium bromide, and [2-hydroxy-3-(2-ethyl hexyloxy)propyl]triethylammonium iodide.

Particularly preferred catalysts are quaternary β-hydroxy-alkyl-ammonium halides and quaternary β-hydroxycycloalkylammonium halides of the formula:

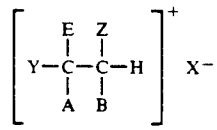

where A and B, are different from each other, and are —OH or —N+R₁R₂R₃, where $R_1$, $R_2$ and $R_3$, which may be the same or different from one another, are $C_1$-$C_{24}$ alkyl, $C_3$-$C_{14}$ cycloalkyl, $C_6$-$C_{14}$ aryl, or a $C_4$-$C_{24}$ group containing mixed alkyl, cycloalkyl and/or aromatic character, optionally containing one or more functional groups selected from among the ether group, olefinic double bond and acetylenic triple bond, and $R_2$ and $R_3$, taken jointly, can also be, together with the quaternary nitrogen atom, a heterocyclic ring.

E and Z, which may be the same or different from one another, are H or $C_1$-$C_{24}$ alkyl, $C_3$-$C_{12}$ cycloalkyl, $C_6$-$C_{14}$ aryl or a $C_4$-$C_{24}$ group of mixed alkyl, cycloalkyl and/or aromatic character, optionally containing one or more functional groups selected from among the ether group, olefinic double bond and acetylenic triple bond, wherein Z can also be replaced by a simple covalent bond with the Y group;

Y is a $C_1$-$C_{50}$ alkyl, a $C_3$-$C_{36}$ cycloalkyl, a $C_6$-$C_{14}$ aryl, a $C_2$-$C_{14}$ heterocyclic with heteroatoms being selected from among O, N, S and P, or a $C_4$-$C_{50}$ group of mixed alkyl, aromatic and/or cycloalkyl character, optionally containing one or more functional groups selected from among ether, thioether, ester, carbonate, amido, olefinic double bond and acetylenic triple bond.

X⁻ is a halide ion, selected from Cl⁻, Br⁻ and I⁻.

Preferably, $R_1$, $R_2$ and $R_3$ are $C_1$-$C_{18}$ alkyl, $C_5$-$C_{10}$ cycloalkyl, $C_6$-$C_{10}$ aryl or a $C_6$-$C_{10}$ group containing mixed alkyl, cycloalkyl and/or aromatic groups. E and Z are preferably $C_1$–$C_{18}$ alkyl, $C_5$–$C_{10}$ cycloalkyl, $C_6$–$C_{10}$ aryl or $C_6$–$C_{14}$ mixed alkyl, cycloalkyl and/or aromatic groups. More preferably, E and Z are hydrogen. Y is preferably $C_1$–$C_{36}$ alkyl, $C_5$–$C_{14}$ cycloalkyl, $C_6$–$C_{10}$ aryl, a $C_3$–$C_{12}$ heterocyclic group in which the heteroatoms are selected from among, O, N, S and P, or a $C_4$–$C_{36}$ mixed alkyl, aromatic and/or cycloalkyl group. Y preferably contains from 1 to 6 ether groups along its chain. $X^-$ is preferably either iodide or bromide.

These catalysts are prepared by reaction of a monoepoxide, or of a mixture of several monoepoxides, with a suitable amount of a secondary monoamine compound having the formula $R_2R_3NH$, or of a mixture of secondary monoamine compounds of this type, followed by quaternization of the tertiary β-hydroxyamine, groups resulting from the reaction of equimolar amounts of epoxy groups and amine ($R_2R_3NH$) compound, with an alkyl halide of formula $R_1X$ or with a mixture of several alkyl halides.

The same monoepoxides which are cited as component (B) are suitable for use for preparing such catalysts, and, among them, those monoepoxides are preferably and advantageously used, which are low-viscosity liquids at temperatures lower than 60° C. or, preferably at temperatures lower than 20° C.

Such monoepoxides are preferably selected from monoglycidyl ethers of alcohols and phenols, as well as of monoglycidyl esters of carboxylic, sulfonic, phosphonic acids, and others. Examples of such monoepoxides are: the methyl-glycidyl-ether, ethyl-glycidyl-ether, propylglycidyl-ether, isopropyl-glycidyi-ether, butyl-glycidyl-ether, allyl-glycidyi-ether, phenyl-glycidyi-ether, methyl-phenyl-glycidyi-ethers, α- and β-naphthyl-glycidyl-ether, nonyi-phenyl-glycidyi-ethers, para-cresyl-glycidyi-ether, para-tert.-butyl-phenyl-glycidyl-ether, glycidyl butyrate, glycidyl (meth)acrylate, glycidyl-2-ethylhexanoate, and glycidyl tosylate. Propylene oxide can be advantageously used as well.

Still other monoepoxides which can be used in order to prepare these catalysts include those products which can be obtained by means of the mono-epoxidation of compounds containing one or more olefinic unsaturations. Monoepoxides belonging to such a class of compounds are, e.g., 1,2-epoxy-butane and 2,3-epoxy-butane, 1-methoxy-2-methylpropylene oxide, 1,2-epoxy-5-hexene, 1,2-epoxy-hexane, 1,2-epoxy-decane, 1,2-epoxy-dodecane, 1,2-epoxy-hexadecane, 1,2-epoxy-cyclohexane, 1,2-epoxy-5-cyclooctene, 1,2-epoxy-7-octene, 1,2-epoxy-cyclododecane, 1,2-epoxy-5,9-cyclododecadiene, styrene oxide, 2,3-epoxypropylbenzene, limonene oxide, 2-carene and 3-carene oxides.

Useable as well, are the products resulting from monoepoxidation of monounsaturated and polyunsaturated carboxylic acids, such as oleic acid, linoleic acid, linolenic acid and their derivatives, such as esters or amides; monounsaturated or poly-unsaturated alcohols, such as oleyl alcohol, linalool and their derivatives, such as ethers or esters; amides of carboxylic acids with mono-unsaturated or poly-unsaturated primary or secondary amines, such as allyl amine or oleyl amine. Mixtures of several monoepoxides can also be used.

The monoepoxide, or a suitable mixture of different monoepoxides, is reacted with a compound containing a secondary amino group $R_2R_3NH$, or with a mixture of different compounds of this type, in which $R_2$ and $R_3$ may optionally be part of a ring including the nitrogen atom of —NH— group, and having an alkyl, cycloalkyl, aromatic structure, or a mixed alkyl, cycloalkyl and/or aromatic structure and optionally containing functional groups or linking groups, which may contain or not heteroatoms such as, e.g., ether groups. Secondary monoamine compounds are preferably liquid at temperatures lower than 20° C., and are preferably selected from secondary alkyl, cycloalkyl and arylalkyl amines and aminoethers, as well as from imines and iminoethers. Amine compounds of this type, which can be advantageously used, include diethylamine, dipropylamine, dibutylamine, diisobutyl-amine, dihexylamine, di-2-ethylhexylamine, N-methyl-butyl-amine, N-ethyl-propylamine, N-ethyl-butylamine, N-methyl-cyclohexylamine, N-ethyl-cyclohexylamine, N-ethyl-benzylamine, di-(2-methoxyethyl)-amine, pyrrolidine, piperidine, 4-inethyl-piperidine morphonine, and mixtures thereof.

The amounts Of monoepoxide and of secondary monoaminic compound reacted with each other in order to prepare these catalysts are such that the ratio of the epoxide groups to —NH— groups is not higher than, and preferably equal to 1.

The tertiary amino groups obtained from the reaction of epoxy groups with —NH— groups are then transformed into quaternary ammonium groups, by reacting the product resulting from the previous reaction between monoepoxide and secondary monoamine compound, with an amount of an alkyl monohalide $R_1X$, or of a mixture of different alkyl monohalides, which is stoichiometrically equivalent to, or higher than the amount of secondary monoamine compound used, and in particular, such that the molar ratio of the alkyl monohalide to the secondary monoamine compound is within the range of from 1.0 to 1.1. The alkyl monohalide is selected from aliphatic, cyclo-aliphatic and aryl-aliphatic monochlorides, monobromides and monoiodides, and optionally also contains functional groups, or linking groups selected from among ether groups, olefinic double bonds, and acetylenic triple bonds. Alkyl monoiodides or alkyl monobromides are preferred.

Alkyl monoiodides which can be used include iodomethane, iodoethane, 1-iodopropane, 1-iodobutane, 1-iodopentane, 1-iodo-3-methyl-butane, 1-iodohexane, 1-iodoheptane, 1-iod0octane, 1-iodododecane, 1-iodohexadecane, 1-iodooctadecane, allyl iodide and mixtures thereof.

Alkyl monobromides which can be used include bromomethane, bromoethane, 1-bromopropane, 1-bromobutane, 1-bromopentane, 1-bromo-3-Methyl-butane, 1-bromohexane, 1-bromo-heptane, 1-bromooctane, 1-bromodecane, 1-bromododecane, 1-bromotetradecane, 1-bromooctadecane, allyl bromide and crotyl bromide, 1-bromo-1-propene, and mixtures thereof.

The reaction between the onoepoxide or monoepoxide mixtures, and the secondary monoamine compound, and the following quaternization of the resulting tertiary amino groups with the alkyl monohalide can be carried out both by using only the reactants listed above, or with the aid of known solvents which are non-reactive or poorly reactive with the chemical functional groups contained in the reaction mixture, and subsequently easily removable by distillation. Useable solvents for preparing the catalyst comprise tetrahydrofuran, dioxane, 1,2-dimethyoxyethane, di-isopropyl ether, tert.-butyl-methyl ether, hexane, heptane, cyclohexane, methyl-cyclohexane, benzene, toluene, nitromethane, and mixtures thereof. The preparation of the catalysts is advantageously carried out without using solvents, or with the aid of small solvent amounts.

For illustrative purposes, a suitable process for the preparation of the catalyst, may take place through the following steps:

(a) The secondary mono-amine compound is gradually added, with stirring, to the proper mono-epoxide (or mixture of several mono-epoxides) in the liquid state, or liquefied by dilution with a suitable solvent or solvent mixture, in a reaction vessel, preferably previously purged with an inert, dry gas, and kept at a temperature which is preferably within the range of from 0° C. to 150° C.

(b) When the addition of the amine compound is complete, the reaction mixture is kept stirred at a temperature within the same range as specified above, for a time period which may range from 0.5 to 8 hours; any secondary amine compound possibly unreacted is removed by distillation under atmospheric pressure, or under a reduced pressure.

(c) Still with stirring, and under a flowing stream of an inert gas, the alkyl halide is added, with the temperature of the reaction mixture being simultaneously kept within the range of from 0° C. to 40° C. The same mixture is then kept stirred at a temperature within the same range, for a time period of from 1 to 6 hours. Still with stirring, the reaction mixture is then brought up to, and kept at, a temperature preferably within the range of from 50° C. to 120° C., for a time period ranging from 6 to 60 hours, and then is cooled.

(d) The solvent, if used, and any possibly unreacted alkyl halide are removed by distillation under atmospheric pressure, or under a reduced pressure.

The catalysts obtained are, at a temperature lower than 60° C., more or less viscous liquids with a variable color, spanning from light yellow to brown. The mixtures of components A/B are liquids, preferably low-viscosity liquids, at temperatures lower than 60° C., as well as stable, in the absence of catalyst C, over a relatively long time, at temperatures both higher than, and lower than 60° C.

The beta-hydroxy-alkyl ammonium and the beta-hydroxycycloalkyl ammonium catalysts are particularly preferred since these catalysts have the surprising ability to heat the catalyst/resin composition or reactive mixture very quickly under the influence of microwave irradation. For example, when a catalyst such as tetrabutylammonium iodide is used with the mixture of a polyisocyanate and epoxide, the reactive mixture does not reach a temperature of even 30° C. after 30 min. In contrast, irradiating the ammonium catalysts described above with microwaves heats the reactive mixture to 150° C. in 1-2 min. This rapid heating and polymerization are essential for processes such as RIM. Such fast heating and polymerization are not achievable using conventional catalysts and conventional thermal curing processes.

The catalyst can be used neat or diluted with a suitable amount of a liquid mono-epoxide or poly-epoxide selected from among those indicated above as constituents of component B of the composition.

Preferably, catalyst (C) is a compound which is soluble in the mixture of (A) and (B) at the curing conditions.

According to the present invention, the catalyst (C) is mixed with the components (A) and (B) in quantities that depend upon the nature and the reactivity of each specific catalyst. Preferred quantities are in the range 0.02 to 3% by weight, and more preferably from 0.1 to 2 wt. %, with respect to the sum of (A) and (B).

The composition of components (A), (B), and (C), may contain other additives or components such as stabilizers, antioxidants, diluents, or mold release agents, as well as inorganic fillers such as glass beads, calcium carbonate or barium sulfate powder, metallic powders, and/or fibers, e.g., glass fibers, carbon fibers and organic polymeric fibers which are based on polyamides, polyesters, aramids, polyimides, and the like.

The components (A), (B), and (C) and the other components and additives are generally mixed in step (i) either manually or by means of a mixing device. The catalyst (C) is preferably predissolved in the isocyanate component (A). Those compositions which are solid at room temperature or those with a high viscosity, are preferably mechanically homogenized.

The compositions are then placed into a microwave heating device which is shaped and equipped according to the specific technology to be applied and the article to be obtained. Details on the design of heating devices for microwave curing of thermosetting resins can be found, for example, in J. Jow et al in "Review of Scientific Instruments", 1989, page 96. The preferred device for performance of the present invention is a single-mode resonant cavity. However, the present invention is not limited to use of this device and can be performed in any microwave heating equipment.

The electromagnetic radiation applied in step (ii) of the present process can be either continuous or pulsed. In the first case, shorter reaction times are achieved, but the temperature profile becomes more difficult to control. In certain cases, modulation of the power is conveniently used.

Preferably, pulsed microwave radiation is applied in the present process. This can be achieved by using an oscillator inserted before the resonance cavity in the microwave circuit. The use of pulsed electromagnetic radiation allows for excellent control of the temperature and, when required, isothermal curing of the compositions which are being processed.

The process of the present invention can be conveniently performed by utilizing the procedures and the apparatus generally known to a person skilled in the microwave technology. Radio frequency generators operating in the range of frequencies and powers as hereinabove indicated are commercially available. The oscillators employed to obtain the pulsing of the electromagnetic radiation are similarly well known. Examples of a schematic drawing of microwave apparatus suitable for the present invention are reported by J. Jow et al in "SAMPE Quarterly", Jan. 1989, page 46.

According to a preferred embodiment, the process of the present invention can be carried out by placing the mixture to be cured, eventually shaped or cast in a mold, in the microwave device connected to the radiation generator and the oscillator.

As used herein, the term "curing" includes both the initial process of curing the reactive mixture of polyisocyanate, epoxide and catalyst, and the process commonly known as "post-curing", which serves to complete polymerization, increase the glass transition temperature (Tg) and improve other mechanical and thermal properties of the fully cured product or article.

Usually, the terms curing and post-curing are used in the conventional processes for the thermal curing of thermosets, to distinguish two stages carried out at different temperatures and time length, with the post-curing stage being the one carried out at a higher temperature and for a longer time. This is normally considered a disadvantage because of waste of time and energy.

In particular, the compositions of the present invention require a long post-curing cycle when thermally cured, because the formation of oxazolidone structures takes place mostly at higher temperatures, whilst at lower temperatures the formation of isocyanurate structures prevails.

The absolute value of the room temperature dielectric constant is a convenient qualitative measure of the extent of reaction and also an indicator of the possible chemical structures formed. If the formation of isocyanurate is the dominant reaction, the dielectric constant value will be approximately 2. On the other hand, in the fully cured material, since both isocyanurate and 2-oxazolidone structures are present, the dielectric constant has a room temperature value which is greater than 2.5.

On the other hand, the microwave curing of the present composition takes place quickly at room temperature to temperatures of about 180° C., without overheating the resin due to the reaction exotherm, and a post-curing stage is not necessarily required to complete the polymerization.

When required, the post-curing may be conducted using thermal curing, additional microwave curing or a combination of these processes. Both processes serve to complete polymerization and to increase the Tg, but the post-curing conducted using microwaves is preferred and more advantageous.

According to the present invention, microwave post-curing is preferably carried out at temperatures between 100° C. and 250° C. Post-curing need not be separated from curing, but may be included in an overall one-step process carried out at different temperatures or at a programmed time-temperature path.

The product obtained by microwave post-curing has different properties than the product thermally post-cured at the same temperature. Specifically, the product which is microwave post-cured has improved dielectric and thermal properties.

Microwave cured and/or post-cured products generally have higher Tg values than the corresponding thermally post-cured products. A further advantage to microwave curing or post-curing is the production of a product which has less thermal expansion per unit of temperature increase than the corresponding thermally post-cured product. The lower degree of expansion provides good dimensional stability to the final cured and molded articles, particularly during operation at high temperatures.

The mixture is irradiated with microwave radiation until the desired degree of cure is obtained, or until no further reaction occurs. The time of irradiation is best established experimentally for each particular mixture. A temperature probe is generally used in order to control the heating rate of the mixture. At the end of the curing, the cured mixture is removed from the cavity and further tested.

The process of the present invention can be carried out either batchwise of continuously by using the appropriate equipment. Continuous processes are, however, particularly preferred.

The process of the present invention can be used in all the known polymerization technologies, either for thermoplastic or thermosetting polymers, which are adaptable to microwaves. Therefore it can be used in continuous or batch polymerization plants, as well as to produce plastic homogeneous articles or composites.

Preferred applications of the present invention are in the bonding and sealing technologies based on the above compositions. Other applications are in the curing of articles made of composite materials based on fibers and resins having the above compositions. In this latter case, the present process is particularly suited for being applied to technologies such as pultrusion, etc.

Other features of the invention will become apparent in the course of the following descriptions of exemplary embodiments which are given for illustration and are not intended to be limiting thereof.

EXAMPLES

All of the microwave examples described were performed utilizing a 7 inch diameter single-mode tuneable cavity purchased from Wavemat, Inc. in Plymouth, Mich. The microwave unit consists of a variable power unit which operates at a frequency of 2.45 GHz, with a maximum output power of 40 watts and a programmable temperature controller. Using this setup, it is possible to perform both constant power curing, monitoring the temperature as a function of time, and isothermal curing by pulsing the microwave power through the use of a controlled loop feedback sequence. When needed, the temperature is monitored using a LUXTRON 755 fluoroptic system.

The reactive mixtures to be irradiated during the curing cycle were usually placed in beakers made of TEFLON in order to minimize the energy which is absorbed by the container.

The viscosities of the liquid resins or compositions were measured by a Brookfield Viscometer, usually operated at 23° C.

At the beginning of the reaction, the temperature probe rests on the bottom of the TEFLON reaction vessel immersed in the liquid reaction mixture. As the curing reaction proceeds, however, the reaction mixture is transformed from a liquid to a gel and then to a solid glass. As this transformation occurs, the temperature probe eventually becomes embedded in the solid piece.

The glass transition temperatures were recorded on a dielectric thermal analyzer (DETA), which measures the dielectric constant and loss factor as a function of temperature. In these measurements, the glass transition temperature is defined as the temperature at which a peak in the loss factor occurs. If this temperature cannot be accurately determined, a working definition of the glass transition temperature is the temperature at which the dielectric constant begins to increase.

Measurements were also made of the expansion coefficients of the produced samples as a function of temperature. These experiments were performed utilizing a dilatometer. Also the absolute values of the expansion coefficients at various temperatures are supplied as further characterization of the materials.

EXAMPLE 1

Synthesis of [2-hydroxy-3-butoxy)propyl]tributyl-ammonium iodide 195.6 of butyl-glycidyl ether was charged to a 5-neck glass flask of 1 litre of capacity equipped with mechanical stirring means, thermometer, reflux condenser, charging funnel and inlet fitting for dry nitrogen, which was slowly passed through the reaction mixture during the whole reaction process. To the flask, the contents of which were previously adjusted at 20°-25° C., 194.1 g of dibutylamine was dropwise added during about 30 minutes and with good stirring, with the temperature of the mixture being kept within the range of 20°-40° C. The temperature of the reaction mixture was then increased, during a time of about 1 hour, up to 80°-85° C. and was kept within that temperature range, still with stirring, for a further time of about 6 hours, and then was cooled down to 0° C. 276.8 g of 1-iodobutane was then added dropwise during a 30-minute period, with the reaction mixture being stirred. The temperature of the resulting mixture was brought, within a time period of approximately 2 hours, to 20°-25° C. After a further 2 hours at that temperature, the reaction mixture was gradually heated up to 90°-95° C. and was stirred at that temperature for about 50 hours; and then cooled down. A yellowish viscous liquid essentially containing [(2-hydroxy- 3-butoxy)propyl]tributylammonium iodide was obtained, which was used without any further purification.

EXAMPLE 2

0.82 grams of a catalyst consisting of [(2-hydroxy-3-butoxy)propyl)tributylammonium iodide (HPTBAI, prepared as described in Example 1) were dissolved at room temperature in 100.0 grams of a "crude MDI" having an isocyanate equivalent weight of 135.3 and a viscosity of 134 cPs at 23° C. The following products were, then weighed into two separate vessels:

87.0 grams of the above isocyanate solution;

54.0 grams of an epoxy resin, consisting of the diglycidylether of bisphenol A, having an epoxy equivalent weight of 184.8 and a viscosity of 9250 cPs at 23° C.

Immediately before performing the microwave curing, the isocyanate solution was added to the epoxy resin and thoroughly mixed for one minute. A mixture having a viscosity of 540 cPs at 23° C. was obtained.

14.1 grams of this mixture were transferred to a TEFLON beaker, a temperature probe (covered with a glass sleeve) was placed into the middle of the liquid and the sample was rapidly placed into the resonant microwave cavity.

The microwave curing consisted of applying 12 watts of power to the sample for a total time of 30 minutes. The maximum temperature which was obtained during this period was 87° C., which was reached after 22 minutes. The glass transition temperature of the produced piece was 55° C., as determined by dielectric measurements, using a heating rate of 2° C./min and a frequency of 1 kHz. A second heating cycle at 2° C./min yielded a glass transition temperature of about 270° C., corresponding to complete, or almost complete reaction.

EXAMPLE 3

A liquid reactive mixture of isocyanate and epoxy resin prepared as described in Example 1, was used for a microwave curing treatment under isothermal conditions. 6.6 grams of the reactive mixture were placed in the microwave cavity and irradiated in such a way as to maintain a temperature of about 35° C. for 10 minutes. This was accomplished by turning the power on and off in a pulsing fashion. During the ten minute period, the temperature varied from 34.3° C. to 35.9° C., indicating that isothermal control during the polymerization reaction was achieved.

After the microwave treatment, the resin sample was removed from the microwave cavity. The glass transition temperature of the produced piece was 45° C., as determined by dielectric measurements, using a heating rate of 2° C./min and a frequency of 1 kHz. The specimen was further post-cured in a conventional oven for 2 hours at 180° C. and a subsequent measurement of the glass transition temperature yielded a value of about 265° C., as determined by dielectric spectroscopy.

EXAMPLE 4

The following products were weighed into separate vessels 105.0 grams of a "crude MDI" having an isocyanate equivalent weight of 133.2 and a viscosity of 44 cPs at 23° C.;

40.5 grams of the same epoxy resin used in Example 2.

The isocyanate was then added to the epoxy resin and thoroughly mixed. To this solution, 4.50 grams of HPTBAI catalyst of Example 1 were added with further mixing, thus obtaining a liquid having a viscosity of 119 cPs at 23° C.

5.0 grams of the resulting mixture were placed in a TEFLON beaker, with the appropriate temperature probe resting in the center of the liquid. This sample, at 23° C., was placed in the microwave cavity and a constant power of 35 watts was applied for 30 minutes while the resin temperature as a function of experimental time was monitored.

After 3 minutes of microwave irradiation, the reactive composition reached a maximum temperature of 99° C. At the end of the 30 minute period of microwave curing, the resin piece was recovered and its glass transition temperature was determined to be 105° C., using a dielectric thermal analyzer which operates at a frequency of 1 kHz and a heating rate of 2° C./min. Room temperature measurements of the dielectric constant yielded a value of 2.4 at a frequency of 100 kHz, indicating that primarily the production of the isocyanurate structures had occurred. After thermal post-curing at 200° C. for 2 hours, the room temperature dielectric constant, at a frequency of 100 kHz, was determined to be about 3.2, indicating completion of cure and formation of both isocyanurate and 2-oxazolidone structures. Determination of the glass transition temperature, after post-curing, produced a value of about 250° C.

EXAMPLE 5

The same components and the same mixing procedure as used in Example 4 were used, except that 105.0 grams of the isocyanate, 44.75 grams of the epoxy resin, and 0.75 grams of catalyst were used. This mixture exhibited a viscosity of 128 cPs at 23° C.

5.0 grams of the isocyanate/epoxy mixture were poured into a TEFLON beaker for the microwave treatment, as in the previous example. A constant power of 35 watts was applied to the mixture for 30 minutes and the temperature as a function of time was determined. The maximum temperature which was reached was 46° C., achieved in 2-3 minutes.

By comparison, a mixture with the same composition was placed in a thermal oven at room temperature and the temperature was set for 46° C. It took the sample in the oven 10-15 minutes to reach 46° C. Then, the oven was set for 60° C. and the temperature of the sample was monitored. It took 5-7 minutes to reach a maximum temperature. This is longer than the time it took to reach a maximum temperature using microwave irradiation.

Thermal expansion coefficients were determined for the microwave-produced sample. The as-produced sample had a room temperature value of about $2 \times 10^{-5}/C$. The fully cured specimen has a final glass transition temperature of about 260° C., as determined by the increase in the expansion coefficient.

EXAMPLE 6

The same components as used in Example 4 were used in this example, except that 3.0 grams of the isocyanate, 1.9 grams of epoxy, and 0.1 grams of catalyst were used. The isocyanate and epoxy were weighed out into separate vessels and then mixed together. After this initial mixing, the catalyst was added and the entire mixture was placed into a TEFLON beaker.

A constant power of 34 watts was applied to the mixture for 30 minutes and the temperature as a function of experimental time was monitored. The maximum temperature which was reached was 90° C., achieved in 4 minutes. The room temperature dielectric constant was determined to be about 2.6 at a frequency of 100 kHz. This value indicates that some formation of the 2-oxazolidone structure, and the isocyanurate structure has occurred.

EXAMPLE 7

The same isocyanate as was used in Example 4 was used in the present example. The epoxy portion consisted of a polyglycidyl novolac resin, based on phenol and formaldehyde, with an average epoxide functionality of 2.6, and an average epoxy equivalent weight of 175. The same catalyst used in Example 2 was used in this example.

3.5 grams of the isocyanate and 1.4 grams of the epoxy were weighed into separate vials. After this initial step, the isocyanate was added to the epoxy and 0.10 grams of the catalyst were added to the mixture in a TEFIDN beaker. The overall mixture was then placed in the microwave cavity with the temperature probe resting in the center of the beaker.

A constant power of 35 watts was applied to the sample for a total time of 30 minutes. The maximum temperature which was obtained during this period was 95° C., which was reached after 3.5 minutes. The room temperature dielectric constant of the solid piece was about 2.1 at a measurement frequency of 100 kHz and the dissipation factor was 0.0013 at the same frequency. The dissipation factor passed through a maximum at a frequency of about 350 kHz when a frequency sweep was performed.

EXAMPLE 8

The following products were weighed into separated vessels:

105.0 grams of a "crude MDI" having an isocyanate equivalent weight of 133.2 and a viscosity of 44 cPs at 23 C;

42 grams of the same epoxide as was used in Example 2.

The isocyanate was added to the epoxide and thoroughly mixed.

To this solution were added 3.0 grams of HPTBAI catalyst with further mixing. Two 5.0 gram samples of the resulting mixture were placed into TEFLON beakers with the temperature probe resting in the center of the fluid and then transferred into the microwave cavity. A constant power of 35 watts for 30 min. was applied to the samples, while the resin temperature was monitored as a function of time. The maximum temperature of both the resin samples was 110 C.

After 30 min., the solid cured resin pieces were removed. One piece was placed into a conventional circulating hot air oven, heated to 150 C, and cured at this temperature for 15 min. The other piece was post-cured in the same microwave cavity as used for the initial curing at 150 C. for 15 min.

BRIEF DESCRIPTION OF THE DRAWING

After post-curing, both samples were analyzed using a dilatometer at a heating rate of 5° C./min.

In FIG. 1 the percent expansion of both samples is reported versus temperature. The microwave post-cured sample shows a much lower percent expansion in the 150° C.–250° C. range of temperatures, with great advantage in applications for high temperature performance.

Figure 1:
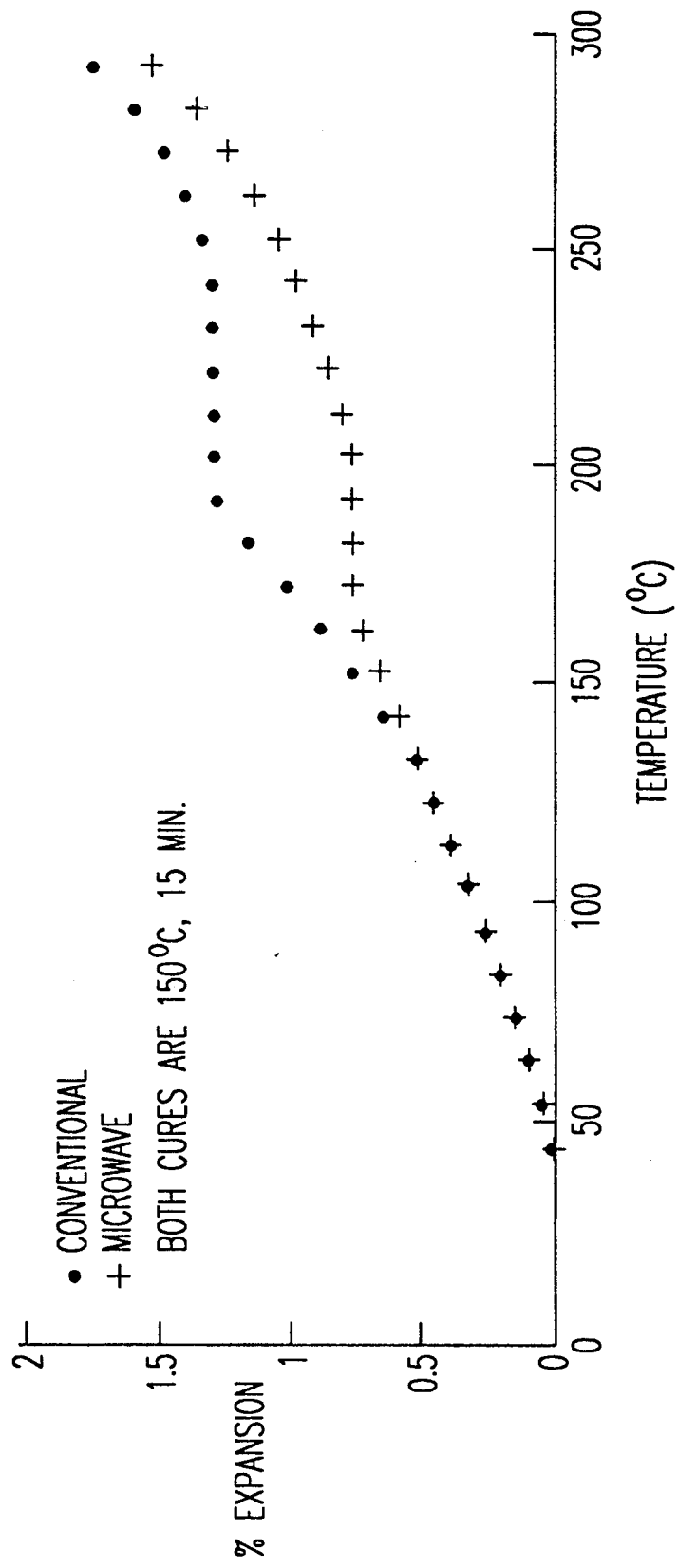
FIG. 1 shows the results in form of a graph.

obviously, numerous modifications and variations of the present invention are possible in light of the above teachings. It is therefore to be understood that within the scope of the appended claims, the invention may be practiced otherwise than as specifically described herein.

We claim:
1. A process for curing a composition containing:
   (a) at least one organic polyisocyanate;
   (b) at least one polyepoxide or a monoepoxide or a mixture thereof;
   (c) 0.02-3% by weight with respect to components (a) and (b) of at least one compound which can catalyze the reaction of epoxides and isocyanates to form 2-oxazolidone structure;
   which comprises irradiating said composition with pulsed or continuous electromagnetic radiation in the microwave frequency range from $10^8$ to $10^{11}$ hertz at a curing temperature between room temperature and 180° C. to produce a solid material.
2. The process of claim 1, wherein the microwave radiation is a pulsed radiation.
3. The process of claim 2, wherein the curing temperature is maintained at a constant value.
4. The process of claim 1, comprising curing said composition by irradiation with microwaves, followed by post-curing at a temperature in the range of 100° C. to 250° C.
5. The process of claim 4, wherein post-curing is a microwave post-curing.

6. The process of claim 4 or 5, wherein the curing and post-curing are carried out in a one-step process.

7. The process of claim 1, wherein said polyisocyanat (a) has the formula $Z(NCO)_m$, wherein q is an aliphatic, cycloaliphatic, aromatic, or heterocyclic group and m is a number greater than 1.

8. The process of claim 7, wherein m is 2 or greater.

9. The process of claim 7 or 8, wherein Q is an aromatic or cycloaliphatic group.

10. The process of claim 1, wherein the number of epoxide groups in said polyepoxide is equal to or higher than 2.

11. The process of claim 1, wherein said compound (c) is a quaternary ammonium salt.

12. The process of claim 11, wherein said ammonium salt is a beta-hydroxyalkyl ammonium halide or a beta-hydroxycycloalkyl ammonium halide which is liquid at a temperature lower than 60° C.

13. The process of claim 1, wherein the molar ratio between the isocyanate groups of the polyisocyanate (a) and the epoxide groups of the epoxide (b), ranges from 1/1 to 6/1.

14. The process of claim 1, wherein said composition further comprises minor amounts of diluents, polymer stabilizers, polymer antioxidants, mold release agents or mixtures thereof.

15. The process of claim 1, wherein said composition further comprises organic or inorganic inert fillers, glass fibers, carbon fibers, polymeric organic fibers or mixtures thereof.

* * * * *